(12) United States Patent
deVries

(10) Patent No.: US 6,347,502 B1
(45) Date of Patent: Feb. 19, 2002

(54) CUTTER ASSEMBLY POSITIONING MECHANISM AND CONTROL FOR RIDING LAWN MOWER

(75) Inventor: Roelof H. deVries, Dalton, OH (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 09/436,300

(22) Filed: Nov. 8, 1999

Related U.S. Application Data

(60) Provisional application No. 60/139,563, filed on Jun. 16, 1999.

(51) Int. Cl.$^7$ ............................................... A01D 34/64
(52) U.S. Cl. ........................................ 56/15.7; 56/17.1
(58) Field of Search ................................ 56/15.7, 15.8, 56/15.1, 17.1, 11.9

(56) References Cited

U.S. PATENT DOCUMENTS

| | | | |
|---|---|---|---|
| 3,063,226 A | * | 11/1962 | Pfauser |
| 3,795,094 A | * | 3/1974 | Mollen et al. |
| 4,102,114 A | | 7/1978 | Estes et al. |
| 4,162,606 A | * | 7/1979 | Weichel |
| 4,307,561 A | * | 12/1981 | Hicks |
| 4,993,216 A | * | 2/1991 | Covington et al. |
| 5,060,462 A | | 10/1991 | Helfer et al. |
| 5,351,467 A | * | 10/1994 | Trefz et al. |
| 5,433,066 A | | 7/1995 | Wenzel et al. |

\* cited by examiner

Primary Examiner—H. Shackelford
(74) Attorney, Agent, or Firm—Harness, Dickey & Pierce PLC

(57) ABSTRACT

A cutter assembly positioning mechanism provides an improved positioning mechanism and control for a riding lawn mower. Specifically, the mechanism optimizes the speed and accuracy of positioning the cutter assembly in the desired position and allows the operator to raise and lower the cutter assembly without sacrificing control of the mower. The lawn mower has a frame including an actuator adapted to be coupled to the frame, a cutter assembly adapted to be movable relative to the frame for adjusting a cutting height and a first flexible member interconnecting the actuator and the cutter assembly. The actuator is operable to extend and retract thereby raising and lowering the cutter assembly.

17 Claims, 4 Drawing Sheets

CUTTER ASSEMBLY POSITIONING MECHANISM AND CONTROL FOR RIDING LAWN MOWER

RELATED APPLICATIONS

This application claims the benefit of U. S. Provisional Application No. 60/139,563 filed Jun. 16, 1999.

BACKGROUND OF THE INVENTION

1. Technical Field

The present invention generally relates to a lawn cutting apparatus. More particularly, the present invention pertains to a mechanism for positioning a cutter assembly for a riding lawn mower.

2. Discussion

Operators of lawn cutting equipment often have a need to adjust the position of the cutter assembly relative to the ground over which the lawn mower is driven. The cutter assembly is typically retracted when the mower is driven from one cutting area to another to avoid hitting obstacles such as curbs and stones.

Many riding lawn mowers are equipped with mechanisms for positioning the cutter assembly to a desired cutting height. Most of these mechanisms consist of linkage interconnecting the cutter assembly and a lever which is directly controlled by the operator's hand or foot to engage a series of holes which correspond to specific cutting heights. Although the effort required to lift the cutter assembly is reduced by using leverage, these mechanisms require strength and coordination.

Other cutter assembly lift mechanisms exist that are actuated by an electric motor or a hydraulic cylinder. However, many of these devices have certain undesirable features. Firstly, the operator of the lawn cutting equipment is unable to easily position the cutter assembly at a desired height because the device lacks a positive height setting device. While some of the aforementioned mechanisms include a fine adjustment capability that is facilitated by using a slow actuation means, use of this design sacrifices productivity by making the operator wait. Secondly, many riding mowers are controlled by a steering mechanism that requires the use of both of the operator's hands. Accordingly, operation of the aforementioned lift mechanisms requires the operator to stop the mower in order to take one hand off of the steering mechanism and adjust the cutting height.

SUMMARY OF THE INVENTION

It is therefore an object of the present invention to provide an improved positioning mechanism and control for a riding lawn mower.

It is another object of the present invention to optimize the speed and accuracy of positioning the cutter assembly in the desired position.

It is yet another object of the present invention to allow the operator to raise and lower the cutter assembly without sacrificing control of the mower.

According to the present invention, a cutter assembly positioning mechanism for a riding lawn mower having a frame includes an actuator adapted to be coupled to the frame, a cutter assembly adapted to be movable relative to the frame for adjusting a cutting height and a first flexible member interconnecting the actuator and the cutter assembly. The actuator is operable to extend and retract thereby raising and lowering the cutter assembly.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
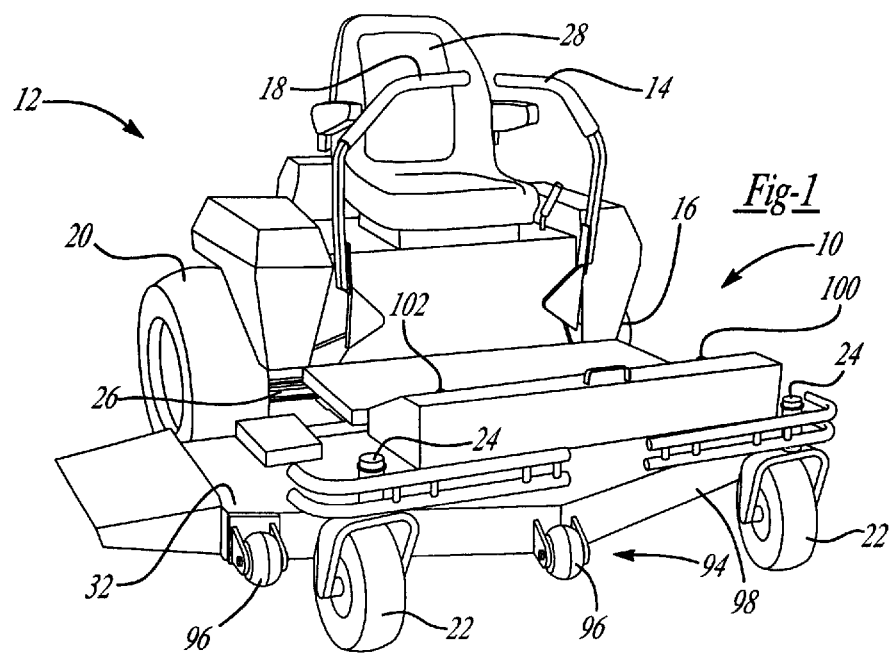
FIG. 1 is a perspective view of a riding lawn mower constructed in accordance with the teachings of the present invention.

With reference to the drawings, a cutter assembly positioning mechanism and control for a riding lawn mower constructed in accordance with the teachings of an embodiment to the present invention is generally identified at reference numeral 10. The cutter assembly positioning mechanism 10 is shown operatively associated with an exemplary riding lawn mower 12. In the preferred embodiment, the riding lawn mower 12 is a zero turning mower capable of performing zero radius turns. The riding lawn mower 12 includes a left steering control lever 14 for controlling a left drive wheel 16 and a right steering control lever 18 for controlling a right drive wheel 20. Accordingly, proper operation of the riding lawn mower 12 requires the use of both of the hands of an operator at all times. The riding lawn mower 12 further includes a pair of front wheels 22 mounted on pivots 24 to facilitate zero radius turns. One skilled in the art will appreciate that the riding lawn mower depicted in the drawings and described in detail is merely exemplary and that the cutter assembly positioning mechanism of the present invention may be utilized in a variety of applications such as riding lawn tractors and walk-behind mowers.

Figure 2:
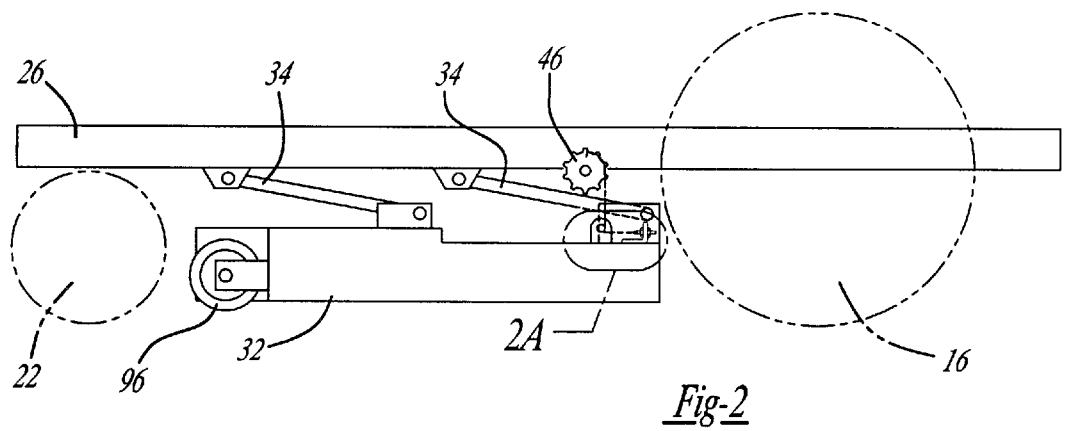
FIG. 2 is a partial side view of the cutter assembly positioning mechanism of the present invention.

Referring to FIGS. 1 and 2, the riding lawn mower 12 further includes a frame 26 having a seat 28, a floor pan 30 and the pivots 24 mounted thereto. The riding lawn mower 12 also includes a cutter assembly 32 pivotally interconnected to the frame 26 via links 34. One skilled in the art will appreciate that the frame 26, the cutter assembly 32 and the links 34 form a four-bar linkage such that the cutter assembly 32 remains in a generally horizontal plane as it is raised and lowered.

Figure 3:
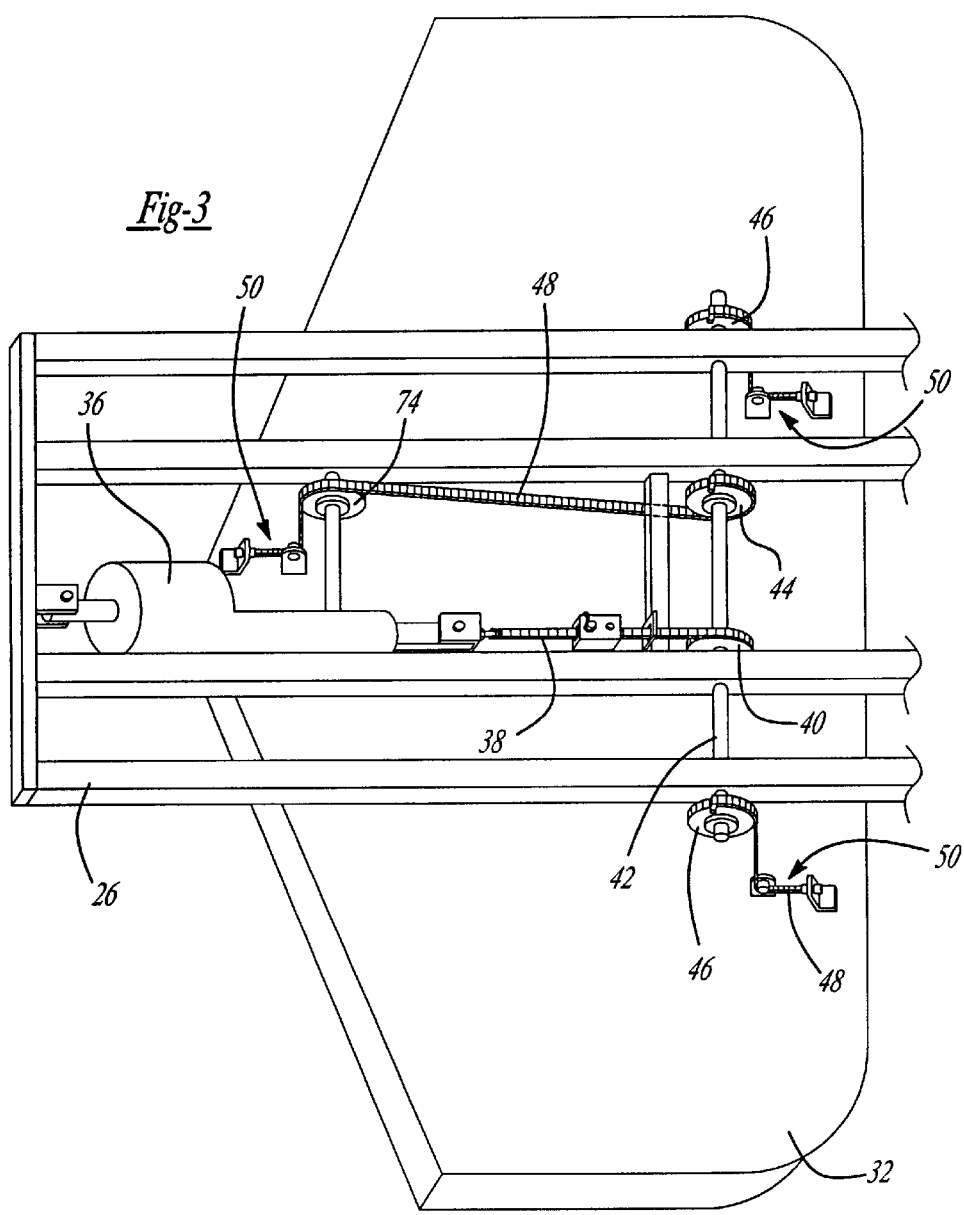
FIG. 3 is a perspective view of an embodiment of the cutter assembly positioning mechanism of the present invention.

As shown in FIG. 3, the cutter assembly 32 is raised and lowered by an actuator 36 interconnected to a roller chain 38. The roller chain 38 is coupled to a first sprocket 40 which is drivingly engaged to a primary shaft 42. Depending on the geometry of the cutter assembly 32, a number of secondary sprockets 44 and 46 may be drivingly engaged with and positioned along the length of the primary shaft 42. The secondary sprockets 44 and 46 are utilized to distribute the lifting effort supplied by the actuator 36 across the surface of the cutter assembly 32. In this manner, a large cutter assembly 32 such as the one depicted in FIG. 3, may be smoothly raised and lowered without binding the links 34 during operation. However, one skilled in the art will appreciate that some cutter assemblies may require only one lift point and that the roller chain 38 may be directly interconnected to the cutter assembly 32 without the need for secondary sprockets. It should also be appreciated that the roller chain 38 is merely an exemplary device and that a variety of flexible members such as wires, cables or belts may be used without departing from the scope of the present invention. In similar fashion, it should be appreciated that other rotary power transfer devices such as gears, pulleys, cogs, bearings, cams and shafts may be implemented instead of sprockets without departing from the scope of the appended claims.

Figure 2A:
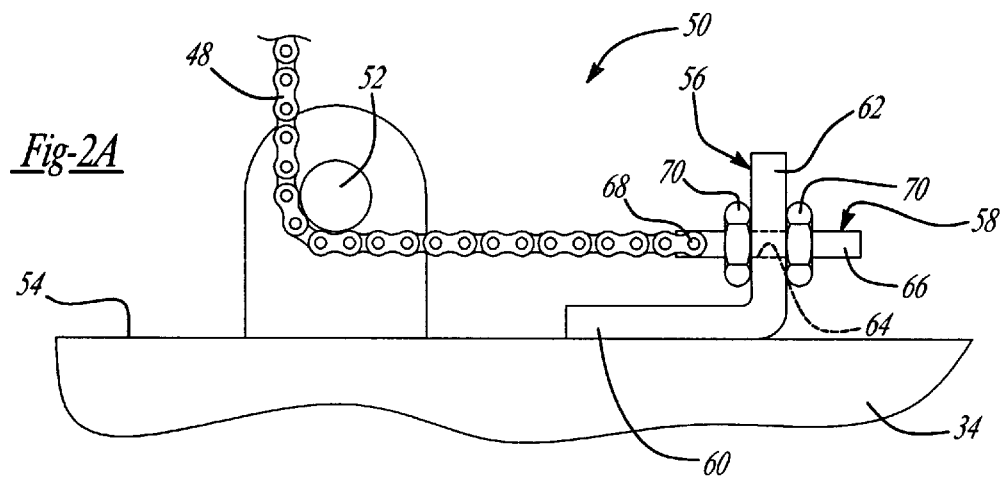
FIG. 2A is a magnified view of the mechanism of FIG. 2.

In the preferred embodiment, an inner secondary sprocket 44 and two outer secondary sprockets 46 drivingly interconnect with the primary shaft 42. Each of the secondary sprockets 44 and 46 are interconnected to the cutter assembly 32 via a flexible member 48. As earlier described, the flexible member 48 may comprise devices such as a chain, a wire, a cable or a belt. As shown in FIGS. 2 and 2A, the flexible members 48 associated with the outer secondary sprockets 46 are directly interconnected to the cutter assembly 32 via an attachment mechanism 50.

The attachment mechanism 50 includes a lift pin 52 mounted to an upper surface 54 of the cutter assembly 32, an "L" shaped bracket 56 also mounted to the upper surface 54 of the cutter assembly 32 and a deck lift stud 58 for interconnecting the flexible member 48 and the "L" bracket 56. Specifically, the "L" bracket 56 includes a first leg 60 coupled to the cutter assembly 32 and a second leg 62 having an aperture 64 extending therethrough. The deck lift stud 58 is a generally cylindrical rod 66 having an external thread extending along a substantial portion of its length. The deck lift stud 58 includes a transverse aperture 68 extending through the rod 66 near one of its ends for receipt of the flexible member 48. Specifically, the flexible member 48 is coupled to the deck lift stud 58 in a manner commonly known in the art such as pinning. In addition, a pair of adjustment nuts 70 cooperate with the external thread of the deck lift stud 58 and the second leg 62 of the "L" bracket 56 to provide an initial adjustment feature whereby the operator may level the cutter assembly if more than one secondary sprocket is used.

Figure 4:
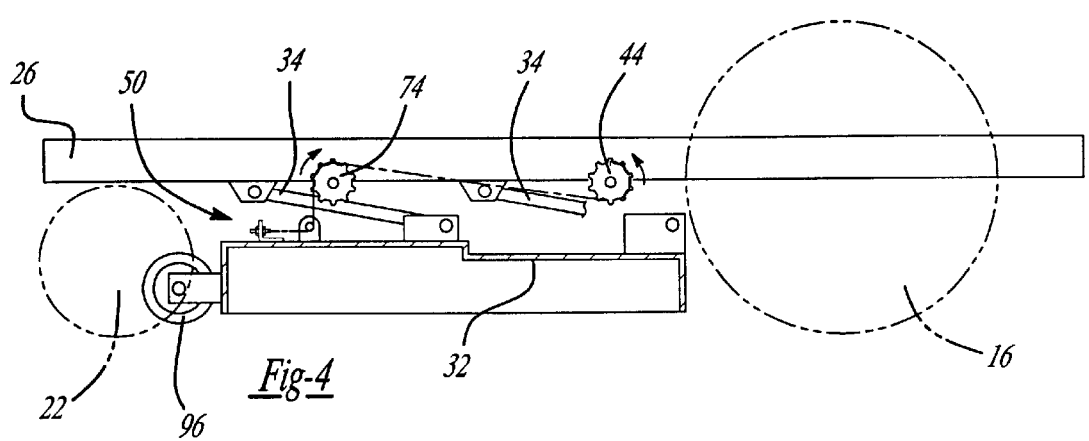
FIG. 4 is a side view of the secondary and tertiary sprockets of the cutter assembly positioning mechanism of the present invention.

Referring to FIG. 3, the inner secondary sprocket 44 and its corresponding flexible member 48 act in cooperation with a tertiary sprocket 72 drivingly engaged with a secondary shaft 74 rotatably coupled to the frame 26. It will be appreciated that the flexible member 48 drivingly engages both the inner secondary sprocket 44 and the tertiary sprocket 72 and is coupled to the cutter assembly 32 via the attachment mechanism 50 as previously described in detail. In reference to FIGS. 3 and 4, as the actuator 36 is extended, the primary shaft 42 rotates in a clockwise direction as viewed from the left side of the riding lawn mower 12. Accordingly, the secondary sprockets 44 and 46 also rotate in a clockwise manner. Based on the routing of the flexible member 48, the tertiary sprocket 72 rotates in a counter-clockwise fashion thereby lowering the cutter assembly 32. Conversely, when the actuator 36 is retracted, the primary shaft 42 rotates in a counter-clockwise direction while the secondary shaft 74 rotates in a clockwise direction thereby raising the cutter assembly 32.

Figure 5:
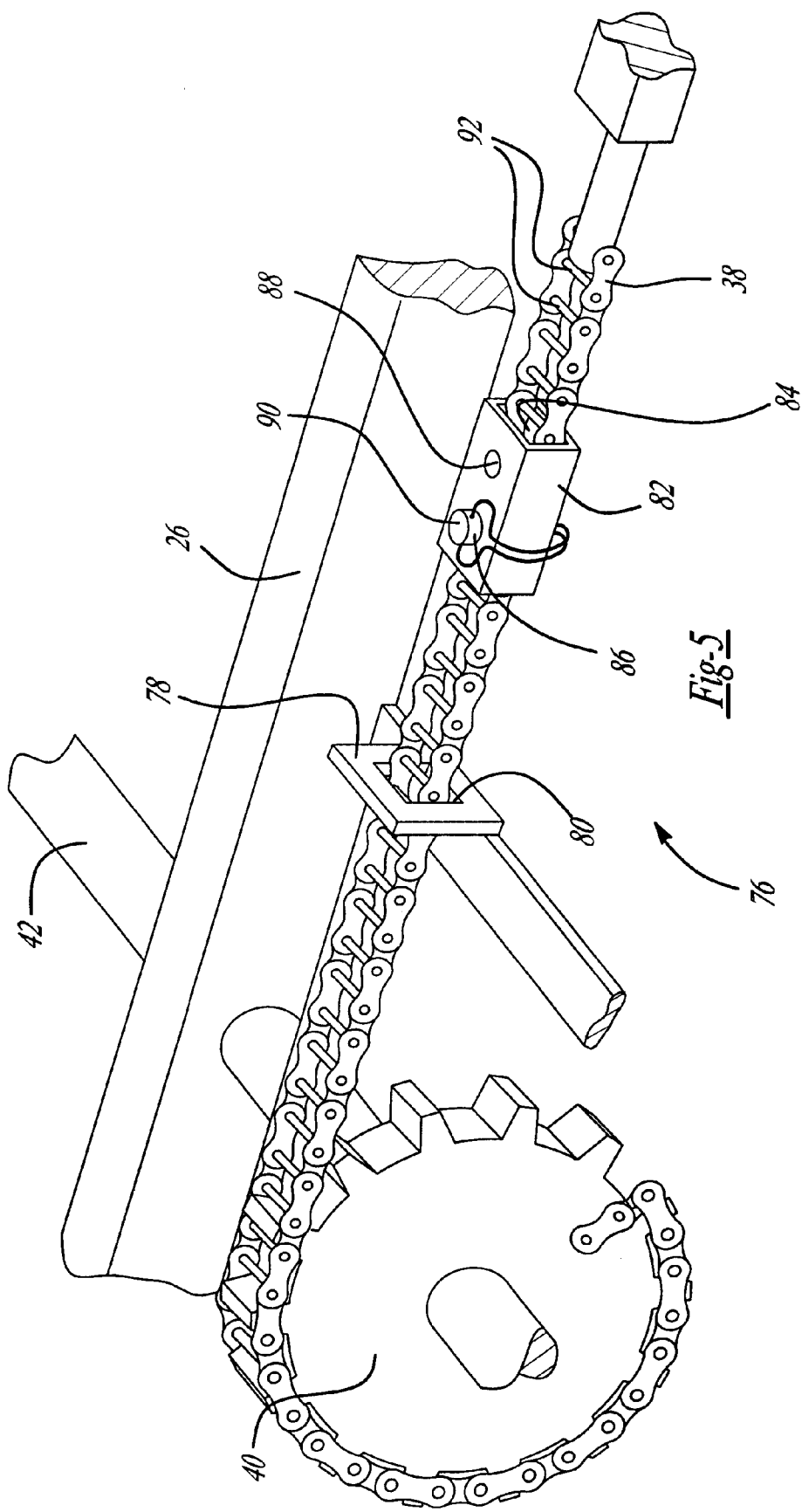
FIG. 5 is a partial perspective view of the cutter assembly positioning mechanism constructed in accordance with the teachings of the present invention.

Referring to FIG. 5, the cutter assembly positioning mechanism 10 of the present invention also includes a cutting height memory mechanism 76. The memory mechanism 76 includes a stop 78 extending from the frame 26. Preferably, the stop 78 defines a passage 80 for guiding the roller chain 38 therethrough. The cutting height memory mechanism 76 also includes a sleeve 82 defining a passage 84 with the roller chain 38 disposed therein. The sleeve 82 includes a first aperture 86 and a second aperture 88 for receipt of a pin 90. The pin 90 is sized to cooperate with the roller chain 38 and the first and second apertures 86 and 88. Specifically, the pin 90 has a diameter less than the minimum spacing between a pair of adjacent rollers 92 of the roller chain 38.

Figure 6:
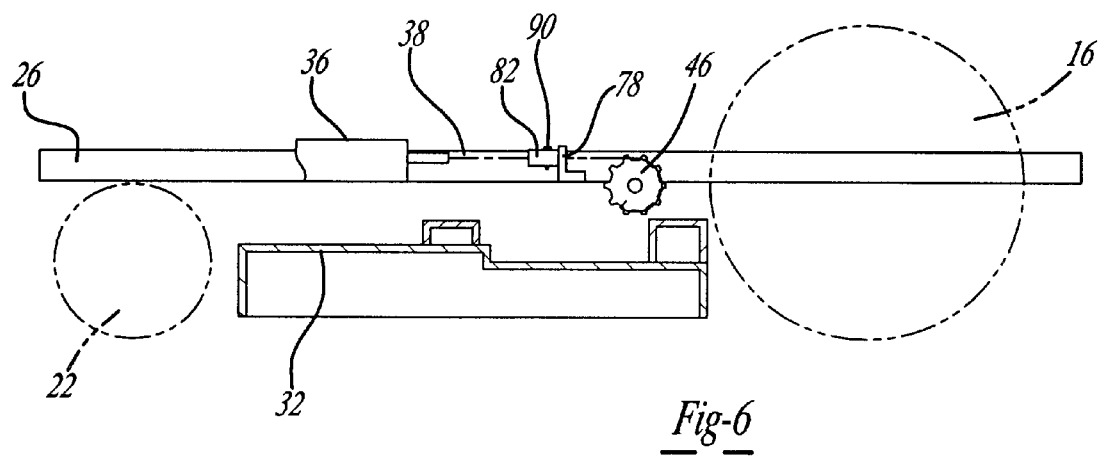
FIG. 6 is a side view of the cutter assembly positioning mechanism depicting the cutting height memory mechanism in an operable position.

In order to provide the cutting height memory mechanism 76 with a relatively fine adjustment increment, the first aperture 86 is spaced apart from the second aperture 88 a distance approximately equal to one and a half times the distance between adjacent roller chain links. Accordingly, when the operator of the riding lawn mower 12 wishes to establish a fixed cutting height, the operator translates the sleeve 82 along the roller chain 38 to abut with the stop 78 as shown in FIG. 6. At this time, the pin 90 is disposed within the aperture best aligned with the space between the rollers 92 to set the memory mechanism 76. Accordingly, the operator may raise the cutter assembly 32 for transport over rough terrain such as rocks or curbs and subsequently lower the cutter assembly 32 until the sleeve 82 engages the stop 78 thereby returning the cutter assembly 32 to exactly the same cutting height previously set. One skilled in the art will further appreciate that the cutting height memory mechanism 76 does not interfere with an anti-scalp lawn protection system 94.

As best seen in FIG. 1, the anti-scalp system 94 includes a plurality of rollers 96 mounted at the forward edge 98 of the cutter assembly 32 to prevent the mower blades from damaging or scalping the turf when traversing uneven terrain. During operation, the anti-scalp system 94 operates to raise the cutter assembly 32 when the rollers 96 are contacted by an obstacle or rapidly changing ground elevation. The cutting height memory mechanism 76 cooperates with the anti-scalp system 94 by allowing the cutter assembly 32 to be lifted by the rollers 96 without operator intervention. Specifically, once the memory mechanism 76 has been set, the sleeve 82 is forced against the stop 78 thereby placing the roller chain 38 in a tensile mode. When in tension, the roller chain 38 limits the downward travel of the cutter assembly 32. However, when an obstacle is encountered, the cutter assembly 32 is free to move in an upward direction because the roller chain 38 becomes slack and the sleeve 82 is no longer loaded against the stop 78. As the riding lawn mower 12 enters smooth terrain, the rollers 96 will no longer be loaded and the cutter assembly 32 will lower until the sleeve 82 once again contacts the stop 78 thereby returning the cutter assembly to the height initially set.

Referring to FIG. 1, the actuator 36 is controlled by the operator's foot or feet. In the preferred embodiment, a first switch 100 and a second switch 102 are located on the floor pan 30 of the riding lawn mower 12. The first switch 100 is preferably located near the operator's left foot and second switch 102 is preferably located near the operator's right foot. Depressing the first switch 100 causes the cutter assembly 32 to lower while depressing the second switch 102 causes the cutter assembly 32 to be raised relative to the ground. One skilled in the art will appreciate that a single switch system may also be implemented to raise and lower the cutter assembly without departing from the scope of the present invention. In addition, it should be appreciated that the actuator 36 may be of an electrical or a hydraulic type.

Figure 7:
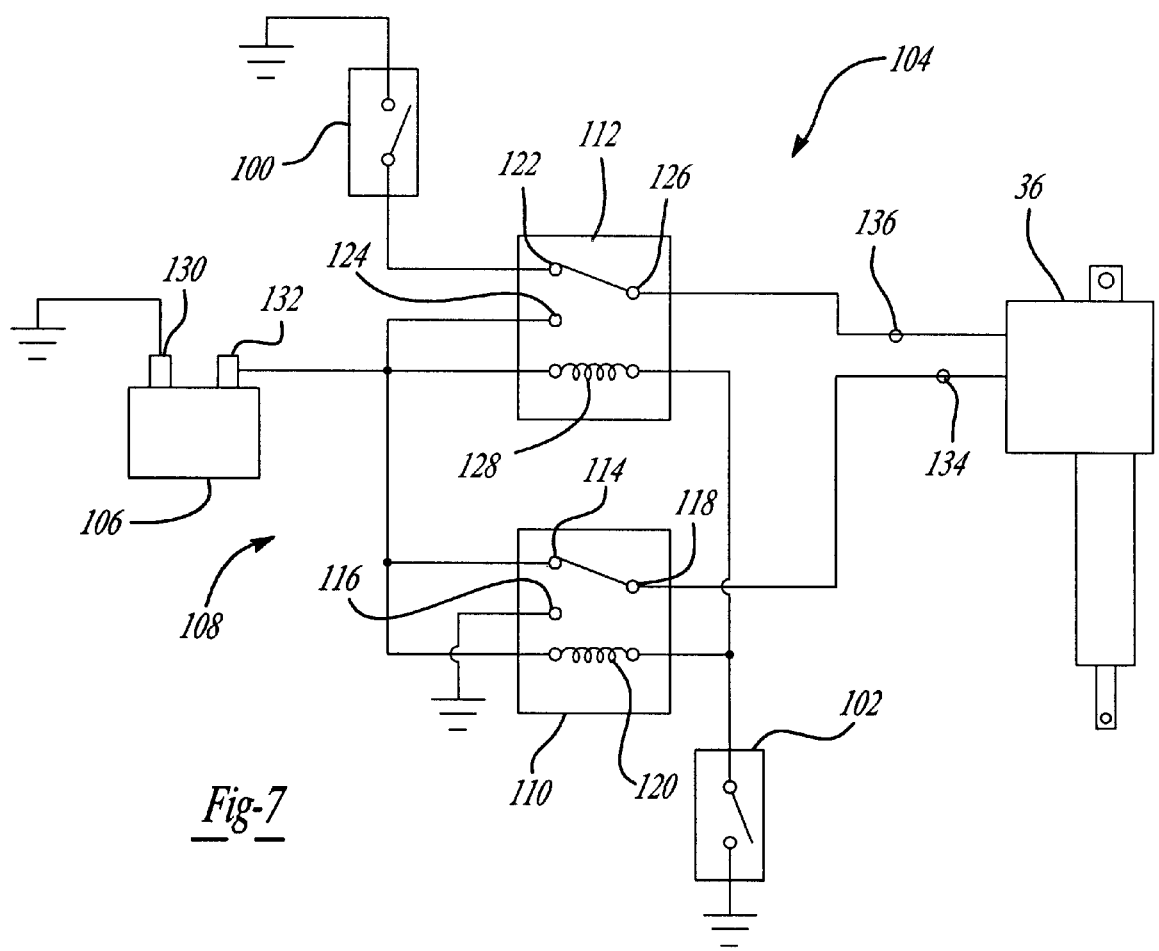
FIG. 7 is an electrical schematic of the control system for the cutter assembly positioning mechanism of the present invention.

Referring to FIG. 7, the preferred embodiment utilizes an electrical control system 104 with the actuator 36 as depicted in the electrical schematic. The control system 104 functions to position the cutter assembly 32 by extending or retracting the actuator 36. Specifically, the control system 104 includes a portable power source 106 preferably mounted to the frame 26 of the riding lawn mower 12. The control system 104 also includes a circuit 108 including the first switch 100, the second switch 102, a first relay 110 and a second relay 112. Each of the relays 110 and 112 are preferably of the dual position, dual throw type having a dual position switch and a coil operable to selectively change positions of the switch. The relay 110 includes a normally closed first position input 114, a normally open second position input 116, an output 118, and a coil 120 selectively energizable for switching the first position 114 to open and the second position 116 to closed. The second relay 112 includes a first normally closed input 122, a second normally open input 124, an output 126, and a coil 128.

Beginning with the portable power source 106, a first battery terminal 130 is connected to ground. A second battery terminal 132 is connected to one side of each of the coils 120 and 128, a first position 114 of first relay 110, and a second position 124 of second relay 112. A first lead 134 of actuator 36 is connected to an output 118 of first relay 110. A second lead 136 of the actuator 36 is connected to an output 126 of second relay 112. Connected to ground are the second position 116 of first relay 110, the first position 122 of the second relay 112 and the second side of each of the coils 120 and 128. The first switch 100 is normally open and positioned between the ground and the first position 122 of the second relay 112 while the second switch 102 is positioned between the coils and ground. Accordingly, when switch 100 is depressed, power is delivered directly to the actuator 36 causing it to extend thereby lowering the cutter assembly 32. Upon release of the first switch 100, the actuator 36 stops due to an open circuit condition. If an operator wishes to raise the cutter assembly 32, the second switch 102 is depressed to close the circuit and energize coils 120 and 128. Once the coils have been energized, each of the relays 110 and 112 switch such that the second position is now closed and the first position is open. In effect, depression of switch 102 reverses polarity to the electric actuator 36 thereby causing the actuator to retract.

An alternate means of controlling the actuator includes implementing a single, three-positioned multi-pole electrical switch that would extend the actuator when moved in a first direction and retract the actuator when moved in a second direction. The single three-positioned switch may also be foot operated.

Another alternate means of controlling the actuator is by way of a single spool, three-position hydraulic valve. The hydraulic valve controls a hydraulic cylinder instead of the electric actuator 36 presented in the drawings. In operation, fluid circulates throughout the system while the hydraulic valve is in the center position. Once the hydraulic valve is moved to one of the two engaging positions, hydraulic fluid is directed to one end of the hydraulic cylinder to extend the actuator. Conversely, once the hydraulic valve is switched to the opposite engaged position, the hydraulic fluid forces the cylinder to retract.

The foregoing discussion discloses and describes merely exemplary embodiments of the present invention. One skilled in the art will readily recognize from such discussion, and from the accompanying drawings and claims, that various changes, modifications and variations may be made therein without departing from the spirit and scope of the invention as defined in the following claims.

What is claimed:

1. A cutter assembly positioning mechanism for a lawn mower having a frame, the positioning mechanism comprising:

an actuator adapted to be coupled to the frame;

a cutter assembly adapted to be movable relative to the frame for adjusting a cutting height;

a first flexible member interconnecting said actuator and said cutter assembly, said actuator operable to extend and retract thereby raising and lowering said cutter assembly; and a stop selectively engageable with said first flexible member to limit the travel of said cutter assembly in a first direction while not impeding travel of said cutter assembly in a second direction opposite said first direction.

2. The cutter assembly positioning mechanism of claim 1 wherein said first flexible member includes a plurality of apertures and wherein said stop comprises a pin disposed within one of said plurality of apertures.

3. The cutter assembly positioning mechanism of claim 2 wherein said stop includes a sleeve defining a longitudinal passage and a transverse pin aperture, said first flexible member disposed within said passage and said pin selectively disposed within said pin aperture.

4. The cutter assembly positioning mechanism of claim 1 further including a guide bracket adapted to be coupled to the frame, said guide bracket engaging said stop to limit the travel of said cutter assembly in said first direction.

5. The cutter assembly positioning mechanism of claim 1 further including a first sprocket and a second sprocket drivingly engaged with a first shaft adapted to be journally supported by the frame, said first sprocket drivingly engaged with said first flexible member and said second sprocket drivingly engaged with a second flexible member interconnecting said shaft and said cutter assembly.

6. The cutter assembly positioning mechanism of claim 5 further including a second shaft having a third sprocket positioned intermediate said second sprocket and said cutter assembly, said third sprocket drivingly engaged with said second flexible member.

7. The cutter assembly positioning mechanism of claim 1 wherein said actuator linearly translates to raise and lower said cutter assembly.

8. The cutter assembly positioning mechanism of claim 1 wherein said actuator is controlled by a foot switch.

9. The cutter assembly positioning mechanism of claim 1 wherein said first flexible member is operable in a tensile mode when a clearance exists between said cutter assembly and the ground, said flexible member resisting movement of said cutter assembly toward the ground when operating in said tensile mode and accommodating movement of said cutter assembly away from the ground.

10. A cutter assembly positioning mechanism for a lawn mower having a frame, the positioning mechanism comprising:

a cutter assembly;

a power source;

an actuator adapted for raising and lowering the cutter assembly;

a control system for selectively connecting said actuator to said power source, said control system including a first switch for selectively energizing said control system and causing said actuator to move in one of a first direction and a second direction thereby positioning said cutter assembly;

a first relay and a second relay, each relay having a normally open and a normally closed position; and a second switch independently operated from said first switch wherein said actuator has a first lead and a second lead, said first relay connecting said first actuator lead to said power source in said normally closed position and to ground in said normally open position, said second relay connecting said second actuator lead to said first switch in said normally closed position and to said power source in said normally open position, said second switch being connected to ground, wherein each of said relays includes a coil having a first end connected to said power source and a second end connected to said second switch, said second switch completing a circuit to ground when closed.

11. A cutter assembly positioning mechanism for a lawn mower having a frame, the positioning mechanism comprising:

a cutter assembly;

a power source;

an actuator adapted for raising and lowering the cutter assembly;

a control system for selectively connecting said actuator to said power source, said control system including a first switch for selectively energizing said control system and causing said actuator to move in one of a first direction and a second direction thereby positioning said cutter assembly;

a flexible member interconnecting said actuator and said cutter assembly; and a stop selectively engageable with said flexible member to limit the travel of said cutter assembly in a first direction while not impeding travel of said cutter assembly in an opposite direction.

12. A cutter assembly positioning mechanism for a lawn mower having a frame, the cutter assembly positioning mechanism comprising:

an actuator;

a cutter assembly;

a flexible member interconnecting said actuator and said cutter assembly, said actuator operable to extend and retract said flexible member for defining a clearance between said cutter assembly and the ground, said flexible member operable in a tensile mode when said clearance is greater than zero, said flexible member resisting movement of said cutter assembly in a first direction when operating in said tensile mode and accommodating movement of said cutter assembly in a second direction opposite said first direction; and a memory mechanism including a stop adapted to be coupled to the frame and a retention device adjustably engageable with said flexible member at a plurality of locations along the length of said flexible member, said retention device limiting the travel of said cutter assembly in said first direction and not in said second direction.

13. The cutter assembly positioning mechanism of claim 12 herein said flexible member includes a plurality of apertures and said retention device is a pin selectively disposable within one of said plurality of apertures.

14. The cutter assembly positioning mechanism of claim 13 wherein said retention device includes a sleeve defining a passage wherein said flexible member is disposed within said passage.

15. A cutter assembly positioning mechanism for a lawn mower having a frame, the positioning mechanism comprising:

a cutter assembly;

an actuator coupled to said frame;

a four bar linkage system pivotally interconnecting said cutter assembly and said frame;

a flexible member interconnecting said actuator and said cutter asssembly, said actuator operable to extend and retract for raising and lowering said cutter assembly;

a rotary power transfer device drivingly interconnected to said flexible member and positioned intermediate said cutter assembly and said actuator; and a stop selectively engagable with said flexible member and said frame to limit the travel of said cutter assembly in said lowering direction while not impeding the travel of said cutter assembly in said raising direction.

16. The positioning mechanism of claim 15 wherein said stop includes a sleeve defining a longitudinal passage, said flexible member disposed within said passage.

17. The positioning mechanism of claim 15 wherein said flexible member is operable in a tensile mode when a clearance exists between said cutter assembly and the ground, said flexible member resisting movement of said cutter assembly toward the ground when operating in said tensile mode and accommodating movement of said cutter assembly away from the ground.

* * * * *